United States Patent [19]
Lange

[11] Patent Number: 4,816,685
[45] Date of Patent: Mar. 28, 1989

[54] ION VOLUME RING

[75] Inventor: Lawrence T. Lange, San Jose, Calif.

[73] Assignee: Lauronics, Inc., Anaheim, Calif.

[21] Appl. No.: 112,064

[22] Filed: Oct. 23, 1987

[51] Int. Cl.[4] ........................ H01J 27/00; B01D 59/44

[52] U.S. Cl. .................................... 250/427; 250/288; 250/292

[58] Field of Search .................... 250/427, 288, 423 R, 250/292, 306

[56] References Cited

U.S. PATENT DOCUMENTS

| | | | |
|---|---|---|---|
| 3,723,729 | 3/1973 | Kruger et al. | 250/427 |
| 3,932,749 | 1/1976 | Taylor | 250/306 |
| 4,039,828 | 8/1977 | Pokar et al. | 250/427 |
| 4,529,571 | 7/1985 | Bacon et al. | 250/427 |

*Primary Examiner*—Bruce C. Anderson
*Attorney, Agent, or Firm*—Woodcock Washburn Kurtz Mackiewicz & Norris

[57] ABSTRACT

An ionizer for a quadrupole filter mass spectrometer has an ion volume ring which surrounds the filament and ionization chamber for 360°. Heat from the filament is absorbed by the ring which suppresses secondary electron emission and directs electrons to the ionization chamber. The ion volume ring is in heat conducting relationship with accelerating and focusing electrodes to transfer heat to the electrodes to reduce contamination. The ion volume ring is electrically connected and is at the same potential as the filament.

8 Claims, 3 Drawing Sheets

FIG. 3
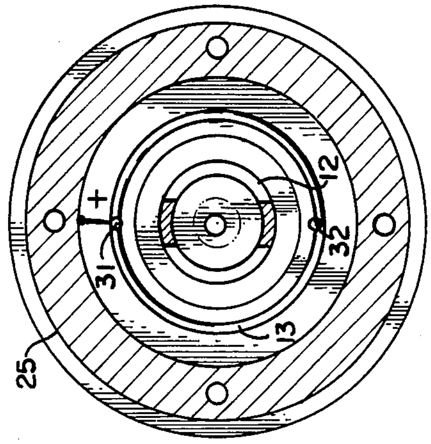
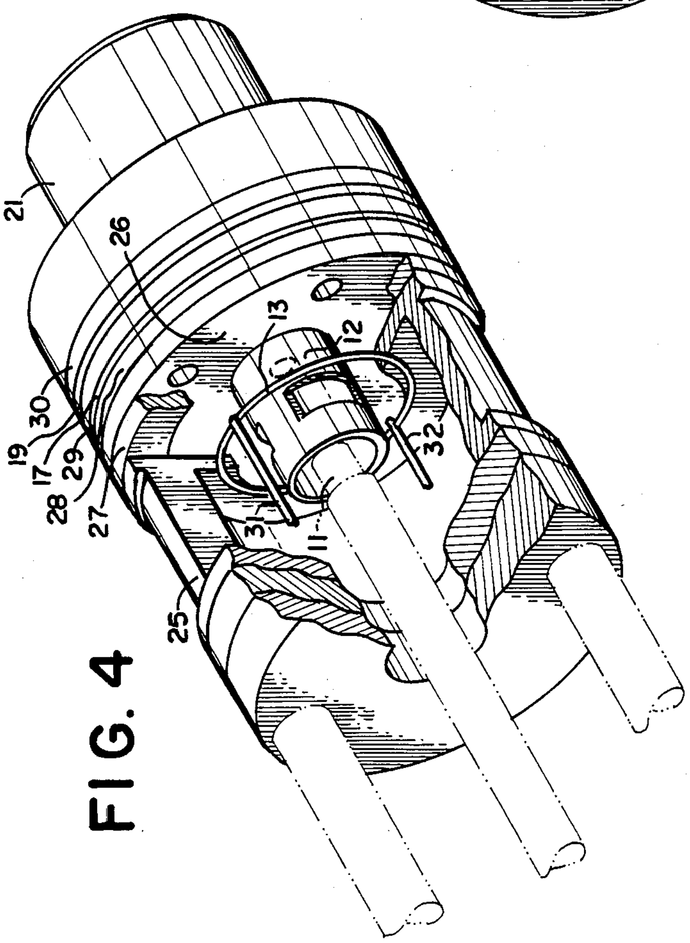
FIG. 4

ION VOLUME RING

BACKGROUND OF THE INVENTION

This invention relates to ionizers and more particularly, to ionizers in which electrons bombard a sample to produce secondary ions for mass spectrometry.

Mass spectrometers operate on the principle of ionization of a sample and separation of the ions according to their mass, or more precisely, their mass-to-charge (m/e) ratio. There gas sample is scanned, producing a mass spectrum, where the amplitude of each peak is proportional to the molecular concentration of each component.

Quadrupole mass spectrometers provide a number of advantages over other types of mass separation methods including rapid scanning, linear mass scale, good resolution, high sensitivity, small size and high reliability.

The quadrupole mass spectrometer consists of a ionizer, focusing lens, mass filter (quadrupole) and a detector housed in a vacuum chamber operated at very low pressure. As sample gas is introduced into the instrument, it is ionized by electrons. Each component within the sample fragments into ions of known mass. The ions are directed to the quadrupole consisting of four parallel rods in symmetrical planes. By operating the rods at the proper voltages and frequency, the quadrupole operates as a selective electronic filter permitting ions of only a particular mass to charge ratio to pass to the detector. Scanning is accomplished by varying the amplitude of the DC/RF ratio over the mass range to be scanned.

Ions that strike the detector produce signals that are amplified and presented as a spectrum of signal intensity vs. mass to charge ratio (m/e). Each component has a unique fragmentation pattern of fingerprint which permits identification. By comparing the sample signal intensity with a signal intensity from a known calibration standard, the unknown sample component concentrations are quantitatively determined. A quadrupole mass spectrometer provides process control and environmental monitoring of multiple components with faster, more accurate, continuous, multiple component measurements, as well as greater reliability and ease of operation.

Mass spectrometers require that the sample molecules be in the gas phase and that the molecules be charged. This is accomplished by an ionizer. U.S. Pat. Nos. 4,388,531 and 4,447,728 —Stafford, et al show typical quadrupole filter mass spectrometers wherein a sample is bombarded with electrons to produce ions which are accelerated through a quadrupole filter which selectively discriminates the ions according to mass.

In such ionizers, auxiliary heaters are sometimes employed at added cost and decreased reliability of operation.

Secondary electron emission is a problem, because it is desired to direct all electrons to the ionization chamber to bombard the samples.

Another problem encountered in these ionizers is contamination on the focusing and accelerating electrodes. Ions striking these electrodes eventually produce a coating on the electrodes which causes erroneous measurements.

The quadrupole filter mass spectrometer is particularly suitable for on-line control of chemical processes and environmental monitoring because of its fast measurement time and easy adaptability to a wide range of measurements. It is desirable to make the quadrupole filter mass spectrometers reliably accurate over long periods of time so that they can be used in process control.

The foregoing disadvantages of prior art analyzers are obviated in accordance with the present invention. Further, the improved ionizer of the present invention adds reliability and accuracy over long periods of time to make a quadrupole mass spectrometer suitable for process control and environmental monitoring.

SUMMARY OF THE INVENTION

In accordance with the present invention, an ionizing ring surrounds the ion source and ionization chamber throughout 360°. Unwanted heat from the filament is absorbed by the ring, which in turn, heats the lens electrode assembly. This heating of the lens electrodes reduces contamination.

The ion volume ring also improves or completely eliminates secondary electron emissions and directs the electrons efficiently to the ionization chamber. This results in a better signal-to-noise ratio and much improved total emission.

SHORT DESCRIPTION OF THE DRAWINGS

FIG. 3 is a section on the line 3—3 of FIG. 2; and

FIG. 4 is a partially broken-away perspective view of the ionization chamber and ion volume ring of the present invention.

DESCRIPTION OF THE PREFERRED EMBODIMENT

Figure 1:
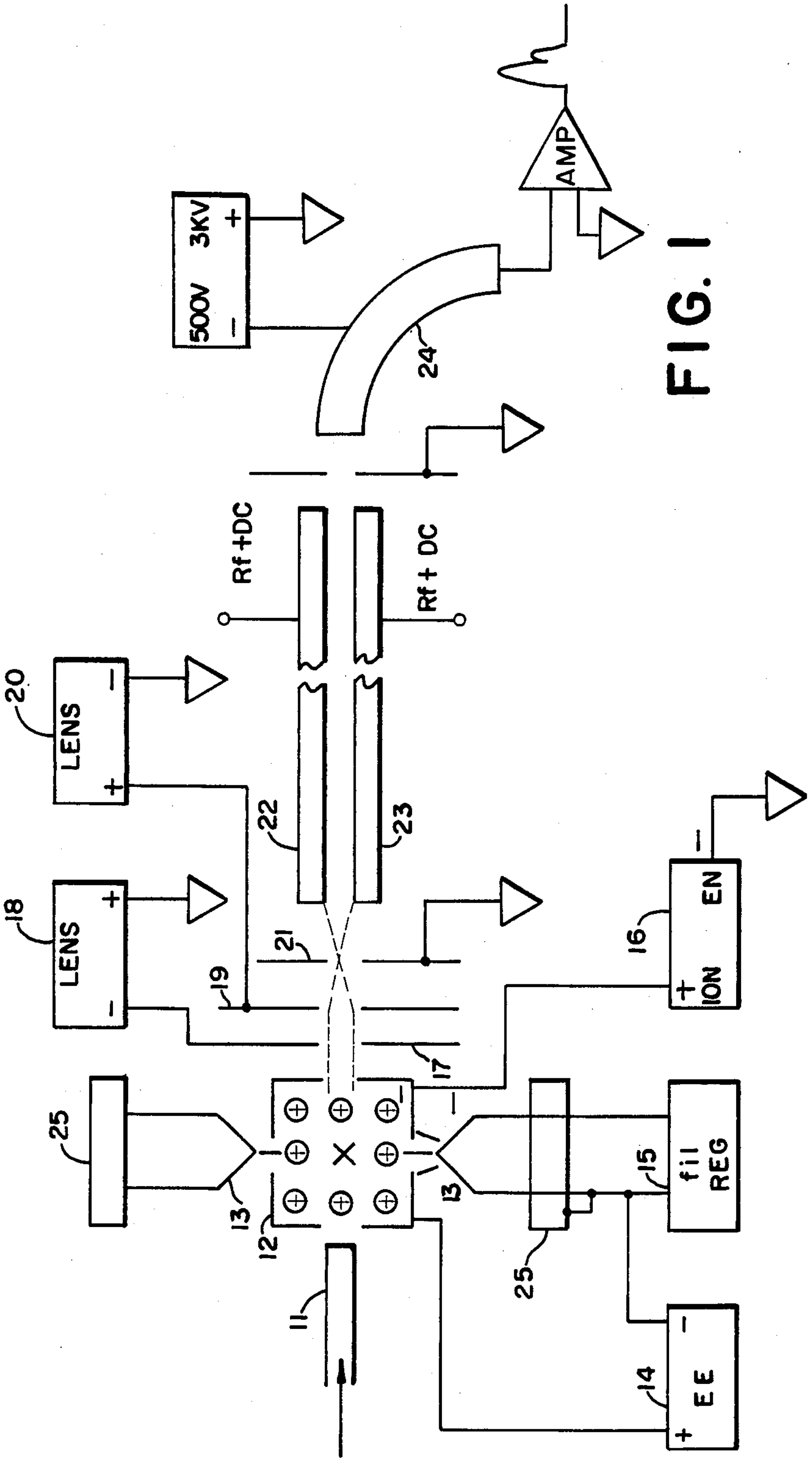
FIG. 1 depicts a quadrupole filter mass spectrometer.

Referring to FIG. 1, sample from a source is directed through sample inlet 11 to an ionization chamber 12. When the sample gas is introduced into the instrument, it is ionized by electrons from the source which includes the circular filament 13. Each component in the sample fragments into ions of known mass. Electron energy is supplied by power supply 14 which is connected between ionization chamber 12 and filament 13. Electron energy supply 14 typically operates at approximately 70 volts.) Filament voltage is supplied by the source 15. Ion energy is supplied by the power supply 16, typically at a voltage of 3.0 to 5.0 volts. The ions acquire a positive charge and are extracted from an opening in the ionization chamber by the extractor lens which includes electrode 17. A first lens power supply 18 applies a voltage in the range of 50 to 150 volts to the extractor lens.

A focus lens includes electrode 19 which is connected to the second lens power supply 20, typically having a voltage in the range of 0.9 to 2.5 volts. The exit lens includes electrode 21 which is at ground potential. The ion stream is focused just in front of the quadrupole filter which consists of four parallel rods, rods 22 and 23 being shown. The four parallel rods are in symmetrical planes. By proper application of RF and DC voltage to the rods, the quadrupole operates as a selective electronic filter permitting ions of only a particular m/e ratio to pass through to the detector. Scanning is accomplished by varying the amplitude of the DC/RF ratio over the mass range to be scanned.

Ions that strike the detector produce signals that are amplified and presented as a spectrum of signal intensity vs. mass to charge ratio. Each component's unique fragmentation pattern or fingerprint permits identification. By comparing the sample signal intensity with signal intensity from a known calibration standard, the unknown sample component concentrations can be quantitatively measured.

In accordance with the present invention, the ionizer for the mass spectrometer includes an ion volume ring 25 which surrounds the ion chamber 12 and filament 13 for 360°. Unwanted heat from the filament is absorbed by the ion volume ring. This suppresses secondary electron emission and directs ions from the source to the ionization chamber. The circular filament is electrically connected to the ion volume ring 25 so that the filament and ion volume ring are at the same potential. All of the electrons from the filament are accelerated toward the ionization chamber 12, with little or no stray electron emission.

Figure 2:
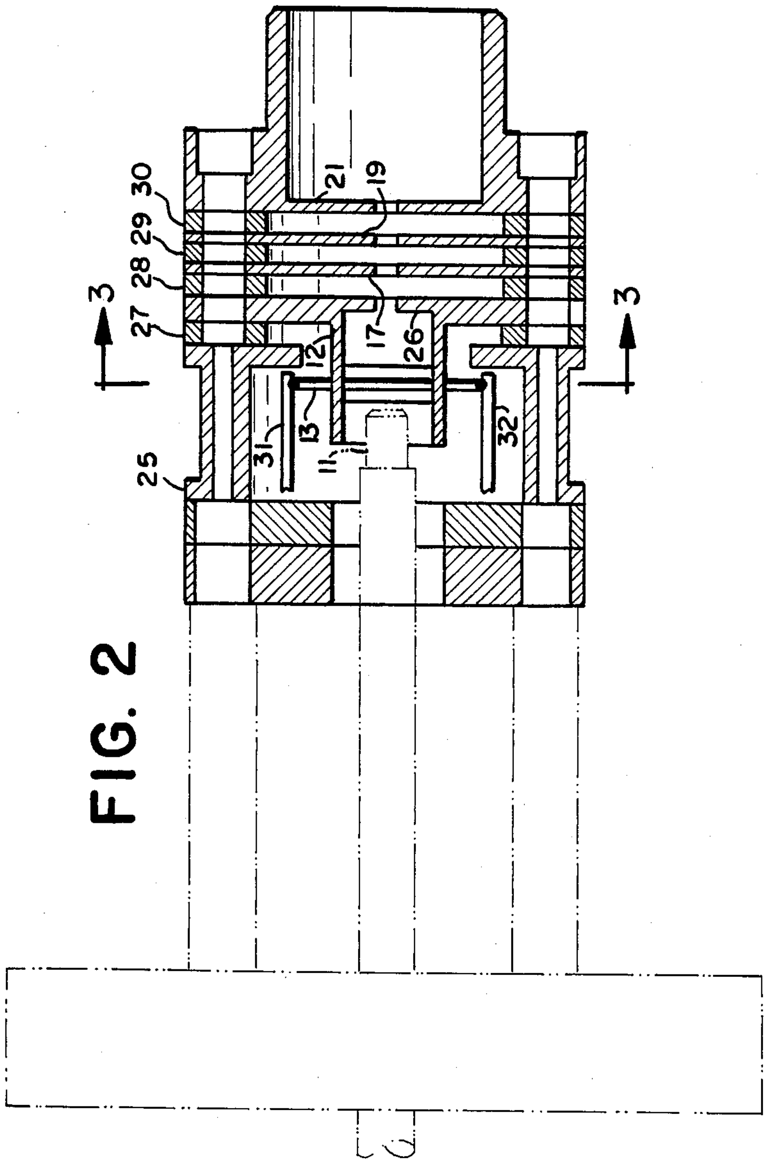
FIG. 2 is a cross-section through the ionizer showing the ion chamber, electron source and ion volume ring of the present invention.

FIGS. 2–4 show the mechanical construction of the ionizer. As best shown in FIGS. 2 and 4, the ionizing chamber 12 is cylindrical with an opening at one end through which the sample inlet 11 extends, and an opening at the other end for passage of ions to the electrodes. The ionization chamber has a circular rim 26 at the other end to support the chamber. The rim 26 is supported on ring 25 by heat conducting spacer 27. Similar heat conducting spacers 28, 29 and 30 support the electrodes 17, 19 and 21 and place them in heat-conducting relationship with the ion volume ring 25.

FIG. 3 shows the ionization chamber 12 encircled by the filament 13. Posts 31 and 32 provide the electrical connections to the filament. The ion volume ring 25 surrounds the ionization chamber 12 and filament 13 throughout 360°.

While a particular embodiment of the invention has been shown and described, various modifications may be made. The appended claims are, therefore, to cover all such modifications which are within the true spirit and scope of the invention.

What is claimed is:

1. An ionizer placed in a vacuum envelope for providing ions of a sample to be analyzed comprising:
- an ionization chamber;
- means for supplying said sample to said ionization chamber;
- an electron source for bombarding said sample in said chamber with electrons to produce ions;
- ion accelerating and focusing electrodes; and
- an ion volume ring surrounding said source of electrons for 360°, heat from said source being absorbed by said ring to suppress secondary electron emission and to direct electrons from said source to said ionization chamber; and said source of electrons is electrically connected to and at the same potential as said ion volume ring.

2. The ionizer recited in claim 1 wherein said ion volume ring is in heat-conducting relationship with said accelerating and focusing electrodes to transfer heat from said source to said electrodes to reduce contamination thereof.

3. The ionizer recited in claim 1 wherein said ionization chamber is cylindrical, has an opening at one end thereof for injection of said sample, and has an opening at the other end thereof for passage of ions to said electrodes.

4. The ionizer recited in claim 4 wherein said ionization chamber has a circular rim at the other end thereof for supporting said chamber.

5. The ionizer recited in claim 4 wherein said rim is supported on said ion volume ring.

6. The ionizer recited in claim 5 wherein said accelerating and focusing electrodes are supported on said rim and said ring by heat-conducting spacers.

7. The ionizer recited in claim 1 wherein said source of electrodes is a circular filament which surrounds said ionization chamber and is positioned between said ionization chamber and said ion volume ring.

8. The ionizer recited in claim 1 in a quadrupole filter mass spectrometer.

* * * * *